US010787602B2

(12) United States Patent
Zhou et al.

(10) Patent No.: US 10,787,602 B2
(45) Date of Patent: Sep. 29, 2020

(54) SHALE INHIBITORS USED IN THE WATER-BASED FLUID FOR SHALE FORMATION

(71) Applicants: CNPC USA CORPORATION, Houston, TX (US); BEIJING HUAMEI INC. CNPC, Beijing (CN)

(72) Inventors: Chun Zhou, Sugar Land, TX (US); Fuchen Liu, Panjin (CN); Yonggui Liu, Daqing (CN); Xingdong Yu, Daqing (CN)

(73) Assignees: CNPC USA Corporation, Houston, TX (US); Beijing Huamei, Inc., Beijing (CN)

( * ) Notice: Subject to any disclaimer, the term of this patent is extended or adjusted under 35 U.S.C. 154(b) by 181 days.

(21) Appl. No.: 16/010,132

(22) Filed: Jun. 15, 2018

(65) Prior Publication Data
US 2019/0382642 A1    Dec. 19, 2019

(51) Int. Cl.
C09K 8/528    (2006.01)
C09K 8/04    (2006.01)

(52) U.S. Cl.
CPC ............ C09K 8/528 (2013.01); C09K 8/04 (2013.01)

(58) Field of Classification Search
None
See application file for complete search history.

(56) References Cited

U.S. PATENT DOCUMENTS

2007/0257234 A1* 11/2007 Gerster ............... C07C 69/604
252/407
2009/0131280 A1* 5/2009 Federici ............... C08G 59/182
507/117

* cited by examiner

Primary Examiner — Jeffrey D Washville
(74) Attorney, Agent, or Firm — Ramey & Schwaller, LLP; William P. Ramey; Melissa D. Schwaller

(57) ABSTRACT

A shale inhibitor to improve the application of water-based drilling fluid in the shale formation rock is provided. An embodiment of the shale inhibitor is the reaction product of an amine, such as triethanolamine, and epichlorohydrin in water solution. Another embodiment of the shale inhibitor is the reaction product of triethanolamine, epichlorohydrin, and hypophosphorous acid. It is highly effective and has a better performance than most commercial products on preventing the disintegration and swelling of the shale formation.

19 Claims, 2 Drawing Sheets

SHALE INHIBITORS USED IN THE WATER-BASED FLUID FOR SHALE FORMATION

FIELD

The disclosure relates generally to fluids used for the drilling of wells. The disclosure relates specifically to shale inhibitors which are effective for the inhibition of swelling of clay and shale which contact with the fluids used in the drilling of oil and gas wells.

BACKGROUND

A drilling fluid employed in drilling a well in a subterranean formation serves several functions in the drilling process. A drilling fluid should circulate throughout the well and carry cuttings from beneath the bit, transport the cuttings up the well and allow their separation at the surface. The functions of the drilling fluid also include sealing of the sides of the wellbore to prevent drilling fluid from permeating through the formation, cooling and cleaning the drill bit, provision of a hydrostatic head to prevent blowouts from high pressure fluids entering into the formation, and reduction of friction between the drill string and the sides of the hole.

Drilling fluids can be classified in accordance with the fluid base. In oil-based fluids, solid particles are suspended in oil. In water-based fluids, solid particles are suspended in water. One of the concerns in using a fluid is that the shale formation solids are very reactive to water. The shale formation solids that become dispersed in a drilling fluid are typically the cuttings produced by the drill bits action and the solids produced by borehole instability. The shale formation solids absorb water and swell. Shale minerals are crystalline in nature. Shale swelling is a phenomenon in which water molecules surround a shale crystal structure and position themselves to increase the structure's volume. The overall increase in bulk volume accompanying shale swelling impedes removal of cuttings from beneath the drill bit, increases friction between the drill string and the sides of the borehole, and tends to create an unstable wellbore. The diameter of some portions of the wellbore can be either smaller or larger than desired. In an extreme situation, it can decrease the stability of the wellbore to such an extent that the wellbore will collapse.

To minimize shale destabilization, an oil-based drilling fluid can be used in an effort to control the water in the drilling fluid. However environmental concerns have limited disposal of these oily, spent slurries. Consequently, water-based fluids have become more and more the fluid of choice in the oil industry, although the use of water-based fluids can bring added complications, due to interactions between the shale formation solids and water.

To counteract the propensity of aqueous drilling fluid to interact with reactive shales in the formation, a shale inhibitor can be added into the water-based drilling fluid. Different shale inhibitors have been developed with the goal of decreasing ion exchange, changes in water content of shales, and changes in swelling pressures in shales.

Quaternary ammonium compounds of U.S. Pat. No. 5,097,904 were tested and the results were not acceptable for use. A compound from U.S. Pat. No. 7,250,390, —H—(OR)x-[—NH—CH2-CH2-CH2-O—CH2-CH2-NH—]—(R'O)y-H, wherein R and R' are independently selectable alkylene groups having 2 to 4 carbon atoms, and wherein x and y have independently selected values such that the sum of x and y is at least 1, was tested here and the result was negative with cuttings recovery lower than 80%. higher cuttings recovery is needed. In the Daqing oil field located in north China, drillers commonly encounter hard and brittle formation to drill with caving and even wellbore collapse problems. Analyzing the clay mineralogy, it is found that there are around 30-70% illite/smectite mixed layers with expandability over 30%. A special and novel shale inhibitor should be developed to reduce the hydration and disintegration of the active clay.

SUMMARY

An embodiment of the disclosure is a shale inhibitor comprising: a reaction product of at least one alcoholic amine and epichlorohydrin. In an embodiment, the at least one alcoholic amine is comprised of monomer, dimers (n=2), trimers (n=3), or oligomers (n>3) of ethanolamine. In an embodiment, a weight percentage of a product of triethanolamine and epichlorohydrin ranges from 5-100 wt %. In an embodiment, a weight percentage of a product from the dimer amines of triethanolamine ranges from 10-60 wt %. In an embodiment, a weight percentage of a product from trimer amines of triethanolamines and epichlorohydrin ranges from 0-30 wt %. In an embodiment, a weight percentage of a product from oligomer triethanolamines and epichlorohydrin ranges from 0-30 wt %. In an embodiment, activity of the shale inhibitor ranges from 10-75%. In an embodiment, the activity of the shale inhibitor is about 70%. In an embodiment, the inhibitor comprises residue amines. In an embodiment, further comprises hypophosphorous acid and its salt derivatives. In an embodiment, the at least one alcoholic amine is comprised of monomers, dimers (n=2), trimers (n=3), or oligomers (n>3) of ethanolamine. In an embodiment, a weight percentage of a product of triethanolamine and epichlorohydrin is in the range of 5-100 wt %. In an embodiment, a weight percentage of a product from the dimer amines of triethanolamine ranges from 10-60 wt %. In an embodiment, a weight percentage of a product from trimer amines of triethanolamine and epichlorohydrin ranges from 0-30 wt %. In an embodiment, a weight percentage of a product from oligomer triethanolamines and epichlorohydrin ranges from 0-30 wt %. In an embodiment, activity of the shale inhibitor ranges from 10-75%. In an embodiment, the activity of the shale inhibitor is about 70%. In an embodiment, the inhibitor comprises residue amines. In an embodiment, the weight percentage of the residue amines is 0-20% wt.

An embodiment of the disclosure is a water-based fluid comprising the shale inhibitor of claim 1, wherein a concentration range of the shale inhibitor is 0.3-5 wt %.

An embodiment of the disclosure is a shale inhibitor comprising: a reaction product of triethanolamine (TEOA) and epichlorohydrin. In an embodiment, the amines are comprised of monomer, dimers (n=2), trimers (n=3), or oligomers (n>3) of triethanolamine. In an embodiment, a weight percentage of a product of triethanolamine and epichlorohydrin ranges from 5-100 wt %. In an embodiment, a weight percentage of a product from the dimer amines of triethanolamine ranges from 10-60 wt %. In an embodiment, a weight percentage of a product from trimer amines of triethanolamines and epichlorohydrin ranges from 0-30 wt %. In an embodiment, a weight percentage of a product from oligomer triethanolamines and epichlorohydrin ranges from 0-30 wt %. In an embodiment, activity of the shale inhibitor ranges from 10-75%. In an embodiment, the activity of the shale inhibitor is about 70%. In an embodiment, the inhibitor comprises residue amines. In an embodiment, the shale inhibitor further comprises hypophosphorous acid. In an embodiment, the triethanolamine is comprised of monomer, dimers (n=2), trimers (n=3), or oligomers (n>3) of triethanolamine. In an embodiment, a weight percentage of a product of triethanolamine and epichlorohydrin is in the range of 5-30 wt %. In an embodiment, a weight percentage of a product from the dimer amines of triethanolamine ranges from 10-60 wt %. In an embodiment, a weight percentage of a product from trimer amines of triethanolamine and epichlorohydrin ranges from 0-30 wt %. In an embodiment, a weight percentage of a product from oligomer triethanolamines and epichlorohydrin ranges from 0-30 wt %. In an embodiment, activity of the shale inhibitor ranges from 10-75%. In an embodiment, the activity of the shale inhibitor is about 70%. In an embodiment, the inhibitor comprises residue amines. In an embodiment, the weight percentage of the residue amines is 0-20% wt.

An embodiment of the disclosure is a water-based fluid comprising the shale inhibitor wherein a concentration range of the shale inhibitor is 0.3-5 wt %.

An embodiment of the disclosure is directed to a shale inhibitor to improve the application of water-based drilling fluid in the shale formation rock. In one embodiment, the shale inhibitor is a product from triethanolamine ($C_6H_{15}O_3N$) and epichlorohydrin ($C_3H_5ClO$) in a water solution. In another embodiment, the shale inhibitor is a product from monomer, dimers (n=2), trimers (n=3), or oligomers (n>3) of triethanolamine and epichlorohydrin and its monomer (n=1), dimers (n=2), trimers (n=3), or oligomers (n>3) of triethanolamine in water solution. The activity of the product is 10-75%, in a preferred embodiment, the activity is 70%. The weight percentage of the residue amines is range 0-20%. The weight percentage of the product of triethanolamine and epichlorohydrin is in the range of 5-30 wt %. The weight percentage of the product from the dimer amines of triethanolamine ranges from 10-60 wt %. The weight percentage of the product of trimer amines of triethanolamine and/or oligomers triethanolamines and epichlorohydrin ranges from 0-30 wt %.

An embodiment of the disclosure is a water-based drilling fluid comprising the shale inhibitor as described above. The concentration range of the shale inhibitor is 0.3-5 wt % (2-20 ppb). The drilling fluid inhibits the ion-exchange of the active clay. It inhibits the hydration of the clay and reduces the swelling of the clay. It also keeps the clay integration, and especially works well for mixed layers of illite and semectite shale formation.

In an embodiment, the shale inhibitor of the disclosure is highly effective and has a better performance than most commercial products on preventing the disintegration and swelling of the shale formation.

The foregoing has outlined rather broadly the features of the present disclosure in order that the detailed description that follows can be better understood. Additional features and advantages of the disclosure will be described hereinafter, which form the subject of the claims.

BRIEF DESCRIPTION OF THE DRAWINGS

In order that the manner in which the above-recited and other enhancements and objects of the disclosure are obtained, a more particular description of the disclosure briefly described above will be rendered by reference to specific embodiments thereof which are illustrated in the appended drawings. Understanding that these drawings depict only typical embodiments of the disclosure and are therefore not to be considered limiting of its scope, the disclosure will be described with additional specificity and detail through the use of the accompanying drawings in which.

DETAILED DESCRIPTION

Figure 1:
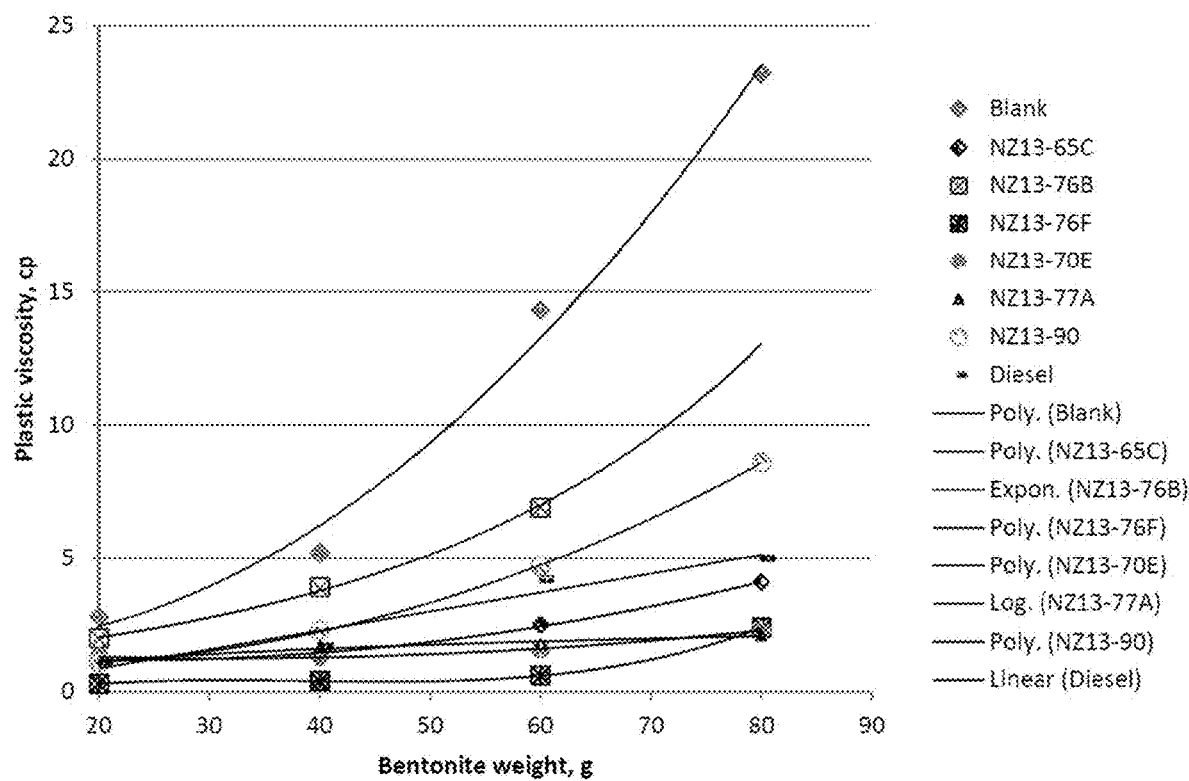
FIG. 1 shows the plastic viscosity comparison of different shale inhibitors at different weights of bentonite.

The particulars shown herein are by way of example and for purposes of illustrative discussion of the preferred embodiments of the present disclosure only and are presented in the cause of providing what is believed to be the most useful and readily understood description of the principles and conceptual aspects of various embodiments of the disclosure. In this regard, no attempt is made to show structural details of the disclosure in more detail than is necessary for the fundamental understanding of the disclosure, the description taken with the drawings making apparent to those skilled in the art how the several forms of the disclosure can be embodied in practice.

The following definitions and explanations are meant and intended to be controlling in any future construction unless clearly and unambiguously modified in the following examples or when application of the meaning renders any construction meaningless or essentially meaningless. In cases where the construction of the term would render it meaningless or essentially meaningless, the definition should be taken from Webster's Dictionary $3^{rd}$ Edition.

As used herein, the term "inhibitor" means and refers to agents in a drilling fluid to retard hydration of the shale adjacent to the wellbore whereby the shale remains intact and basically in its original size, shape, and volume.

The present disclosure is directed to a shale inhibitor used in a water-base drilling fluid for use in drilling wells through a formation containing a shale clay which swells in the presence of water. The terms shale, clay, and shale clay used herein describe hydrophilic rocks that can be encountered during the drilling of wells and which the drilling fluid inhibits the swelling.

In an embodiment, the shale inhibitor of the present disclosure is the reaction product of an amine and epichlorohydrin. In an embodiment, the shale inhibitor of the present disclosure is the reaction product of at least one amine and epichlorohydrin. In an embodiment, the shale inhibitor of the present disclosure is the reaction product of at least one alcoholic amine and epichlorohydrin. In an embodiment, the shale inhibitor of the present disclosure is the reaction product of triethanolamine (TEOA) and epichlorohydrin in a water solution. Triethanolamine is an oily, viscous, organic chemical compound that is a tertiary amine and a triol. Epichlorohydrin is an organochlorine compound and an epoxide. Liquid chromatography-mass spectrometry (LC-MS) is an analytical chemistry technique that combines the physical separation capabilities of liquid chromatography with the mass analysis capabilities of mass spectrometry. LC-MS analysis shows the mass-to-charge ratio (m/z) of the product is 206. In an embodiment, the activity of the product can range from 10% to 75%. In an embodiment, the activity of the product for the field application is about 70%.

In an embodiment, the shale inhibitor is the product from monomer, dimers (n=2), trimers (n=3), or even oligomers (n>3) of triethanolamine and epichlorohydrin and its monomer (n=1), dimers (n=2), trimers (n=3), or even oligomers (n>3) of triethanolamine in a water solution. The LC-MS analysis shows compounds of m/z 188, 206 and 319, 337, 507, 808. In an embodiment, the activity of the product can range from 10% to 75%. In an embodiment, the activity of the product for the field application is about 70%. In an embodiment, the weight percentage of the residue amines is 0-20%. In an embodiment, the weight percentage of the product of triethanolamine and epichlorohydrin is in the range of 5-100 wt %. In an embodiment, the weight percentage of the product of triethanolamine and epichlorohydrin is in the range of 5-30 wt %. In an embodiment, the weight percentage of the product from the dimer amines of triethanolamine ranges from 10 wt % to 60 wt %. In an embodiment, the weight percentage of the product of trimer amines of triethanolamine and/or oligomers of triethanolamines and epichlorohydrin ranges from 0 wt % to 30 wt %.

In an embodiment, the shale inhibitor combines the functional groups of an alcoholic amine. In an embodiment, the shale inhibitor combines the functional groups of a poly alky alcohol and a cationic quaternary amine to inhibit the swelling and disintegration of the shale formation. It can be used in a drilling fluid. It can also be used in other down-hole fluids, such as completion fluids and fracturing fluids, and the like, to stabilize the shale formation.

In an embodiment, the shale inhibitor will be added to a water-based fluid. The shale inhibitor inhibits the ion-exchange of the active clay. It inhibits the hydration of the clay and reduces the swelling of the clay. It also keeps the clay integration, working especially well for mixed layers of illite and semectite shale formation. The exact amount of the shale inhibitor present in a particular drilling fluid formulation can be determined by a method of testing the combination of drilling fluid and shale clay formation encountered. Generally, the concentration range of the shale inhibitor is 0.3-5 wt % (2-20 ppb) depending on the expandability of the clay and mineralogy of the formation.

The following examples are included to demonstrate preferred embodiments of the disclosure. It should be appreciated by those of skill in the art that the techniques disclosed in the examples which follow represent techniques discovered by the inventors to function well in the practice of the disclosure, and thus can be considered to constitute preferred modes for its practice. However, those of skill in the art should, in light of the present disclosure, appreciate that many changes can be made in the specific embodiments which are disclosed and still obtain a like or similar result without departing from the scope of the disclosure.

EXAMPLES

In various embodiments, the shale inhibitors of the present disclosure can inhibit the bentonite swelling and prevent the disintegration of Oxford shale formations.

Example 1. Synthesis NZ13-90 and NZ26-10

Example 1a

In an embodiment, NZ13-90 is made by the following procedure: 86.46 g (0.5795 mol) of triethanolamine and 60 g of water was added to a 1 Liter Round Bottom Flask (RBF) with 4 necks. The Round Bottom Flask was installed with an agitation blade, a temperature probe, a condenser and an additional funnel. The solution was heated in the RBF to 50° C. with agitation and a small nitrogen purge. 53.74 g (0.5808 mol) epichlorohydrin was added to the RBF slowly to avoid a temperature over 90° C., and nitrogen purging was stopped when the addition was done. The temperature was set to 95° C. and the reaction ran an additional 1-2 hours until C1-% ranged from 10-10.5. NZ13-90 is the product from triethanolamine and epichlorohydrin in a water solution. The LC-MS analysis shows m/z 206, the activity is 70%.

Example 1b

In an embodiment, NZ26-10 is made by the following procedure: 298 g (2 mol) of triethanolamine and 4 g of 50% hypophosphorous acid solution were added to a 1 Liter Round Bottom Flask(RBF) with 4 necks. The Round Bottom Flask was installed with an agitation blade, a temperature probe, and a receiver with a condenser. The solution mixture was heated to 220-230° C. for 2-4 hours until the receiver had around 25 mL water. The reaction was cooled to 95° C. and 176 g (1.9 mol) of epichlorohydrin were added slowly to the RBF from an additional funnel. The solution was kept in the RBF at 95-100° C. with agitation for 3-5 hrs until C1-% ranged from 10.5-11.

NZ26-10 is the product from monomer, dimers (n=2), trimers (n=3), or oligomers (n>3) of triethanolamine and epichlorohydrin and its monomer (n=1), dimers (n=2), trimers (n=3), or oligomers (n>3) of triethanolamine in a water solution. The LC-MS analysis shows compounds m/z 188, 206 and 319, 337, 507, 808. The Example 1b product has about 70% activity. In an embodiment, the weight percentage of the residue amines is range 0-20%. In an embodiment, the weight percentage of the product of triethanolamine and epichlorohydrin is in the range of 5-100 wt %. In an embodiment, the weight percentage of the product of triethanolamine and epichlorohydrin is in the range of 5-30 wt %. In an embodiment, the weight percentage of the product from the dimer amines of triethanolamine ranges from 10-60 wt %. In an embodiment, the weight percentage of the product of trimer amines of triethanolamine and/or oligomers triethanolamines and epichlorohydrin ranges from 0-30 wt %.

Example 2. Bentonite Inhibition Test of Shale Inhibitors

Bentonite inhibition testing is considered the simplest of inhibition tests and measures the ability of a chemical to prevent clay hydration. The test measures the weight of API bentonite that can be inhibited by a single treatment of a shale inhibitor over time. This is done by monitoring the rheology profile (i.e., plastic viscosity (PV)). The smaller the increase in the viscosity value with the addition of the bentonite, the better the shale inhibitor. In the test, the shale inhibitor was added to 350 mL of water. 20 g of bentonite was added to the solution and mixed well. The samples were then hot rolled at 70° C. (150° F.) for 16 hrs. After aging via hot-rolling, the rheology profile was measured. Additional bentonite was added to the sample and the cycle was repeated for another 16 hours of hot rolling until the system became too viscous to measure.

Table 1 lists rheology profiles at different weights of bentonite for different shale inhibitors. The results are also graphed in FIG. 1. In Table 1 and FIG. 1, NZ13-65C is potassium chloride, a widely used salt for shale inhibition. NZ13-70E is choline chloride. NZ13-76B is a polyether amine. NZ13-76F is acetate salt of a polyamine. NZ13-77A is tetramethylammonium chloride. Blank indicates that there was no shale inhibitor in the water.

TABLE 1

| | Shale Inhibitors | | | | | | | |
|---|---|---|---|---|---|---|---|---|
| Bentonite(g) | Blank | NZ13-65C | NZ13-70E | NZ13-76B | NZ13-76F | NZ13-77A | NZ13-90 | Diesel |
| 20 | 2.8 | 1.2 | 1.3 | 2 | 0.3 | 1.1 | 1.1 | 1.1 |
| 40 | 5.2 | 1.4 | 1.3 | 3.9 | 0.4 | 1.7 | 2.3 | 1.7 |
| 60 | 14.3 | 2.5 | 1.6 | 6.9 | 0.6 | 1.8 | 4.7 | 4.2 |
| 80 | 23.2 | 4.1 | 2.3 | | 2.4 | 2.1 | 8.6 | 5 |

FIG. 1 plots the plastic viscosity comparison of different shale inhibitors at different weights of the bentonite. Table 1 and FIG. 1 show that NZ13-76F has very good inhibition on shale hydration. Although NZ13-90 is not as good as NZ13-76F in the bentonite inhibition test, the rheology profile of NZ13-90 is near that of diesel in bentonite inhibition test for up to 60 g of bentonite. It is preferred to control the low density solid content around 5-6% in a field drilling fluid. Thus NZ13-90 can be considered as having good inhibition of shale hydration in the drilling fluid.

Example 3. Shale-Particle Disintegration Test by Hot Rolling

A shale-particle disintegration test was originally developed by O'Brien and Chenevert and is currently listed in the American Petroleum Institute's "Recommended Practice for Laboratory Testing of Drilling Fluids, 131", as: "Shale-particle Disintegration Test by Hot Rolling". This method is used widely in the drilling fluid laboratory to assess the degree to which a fluid can cause shale/cuttings to weaken and/or disintegrate when immersed in it. The test procedure includes: grinding, sieving and placing a known mass of shale particles/cuttings into a fluid. The fluid is aged (e.g., hot-rolling) and the shale particles are retrieved, cleaned, and weighed to determine the mass recovery. The mass recovery is used to indicate the tendency of the fluid to prevent the dispersion of a shale in that fluid, typically, percent recovery is reported.

Table 2 lists shale mass percent recovery for different shale inhibitors. The shale inhibitors include NZ13-65C, NZ13-70E, NZ13-76B, NZ13-76F, NZ13-77A, NZ13-90, NZ26-10 and diesel. In the blank test, 350 mL of water was added in a glass bottle with 20 g of Oxford shale (2-4 mm). For other tests, an additional 10 g of shale inhibitor samples, such as NZ13-65C, were added in the glass bottles accordingly. The fluids were aged at 150 degrees Fahrenheit for 16 hrs. After aging, the shale particles were collected with a 35 mesh sieve, washed with 4.27% KCl solution, and dried in the oven until there was no weight loss.

TABLE 2

| Shale inhibitors | Blank | NZ13-65C | NZ13-70E | NZ13-76B | NZ13-76F | NZ13-77A | NZ13-90 | NZ26-10 | Diesel |
|---|---|---|---|---|---|---|---|---|---|
| % recovery | 5 | 22 | 46 | 51 | 70 | 47 | 95 | 96 | 97 |

Figure 2:
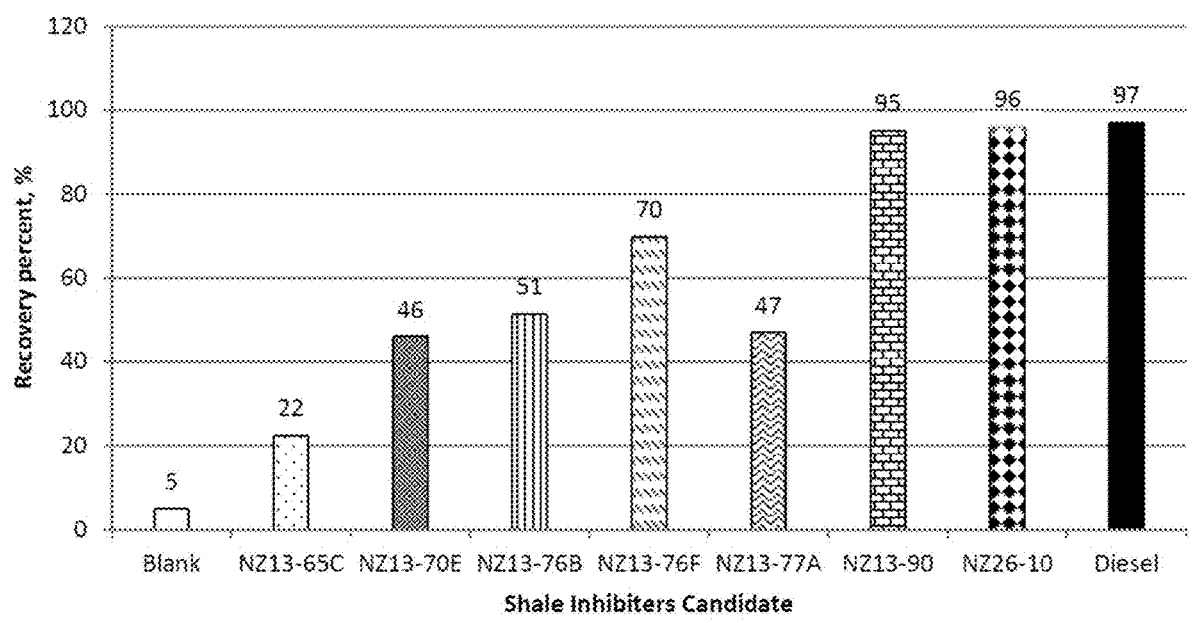
FIG. 2 shows the Oxford shale particle recovery comparison for different shale inhibitors.

FIG. 2 plots the Oxford shale particle recovery comparison for different shale inhibitors.

Table 2 and FIG. 2 show that NZ13-90 and NZ26-10 exhibit superb performance on the disintegration tests with percent recoveries as high as 95% and 96% respectively, far beyond other shale inhibitors such as NZ13-65C, NZ13-70E, NZ13-76B, NZ13-76F, NZ13-77A.

All of the compositions and methods disclosed and claimed herein can be made and executed without undue experimentation in light of the present disclosure. While the compositions and methods of this disclosure have been described in terms of preferred embodiments, it will be apparent to those of skill in the art that variations can be applied to the compositions and methods and in the steps or in the sequence of steps of the methods described herein without departing from the concept, spirit and scope of the disclosure. More specifically, it will be apparent that certain agents which are both chemically related can be substituted for the agents described herein while the same or similar results would be achieved. All such similar substitutes and modifications apparent to those skilled in the art are deemed to be within the spirit, scope and concept of the disclosure as defined by the appended claims.

What is claimed is:

1. A shale inhibitor comprising:
a reaction product of at least one alcoholic amine and epichlorohydrin
wherein the alcoholic amine is selected from the group comprising: trimers and oligomers of ethanolamine.

2. The shale inhibitor of claim 1, wherein a weight percentage of a product of triethanolamine and epichlorohydrin ranges from 5-100 wt %.

3. The shale inhibitor of claim 1, wherein a weight percentage of a product from the dimer amines of triethanolamine ranges from 10-60 wt %.

4. The shale inhibitor of claim 1, wherein a weight percentage of a product from trimer amines of triethanolamines and epichlorohydrin ranges from 0-30 wt %.

5. The shale inhibitor of claim 1, wherein a weight percentage of a product from oligomer triethanolamines and epichlorohydrin ranges from 0-30 wt %.

6. The shale inhibitor of claim 1, wherein activity of the shale inhibitor ranges from 10-75%.

7. The shale inhibitor of claim 6, wherein the activity of the shale inhibitor is about 70%.

8. The shale inhibitor of claim 1, wherein the inhibitor comprises residue amines.

9. The shale inhibitor of claim 1, further comprising hypophosphorous acid and its salt derivatives.

10. The shale inhibitor of claim 9, wherein the at least one alcoholic amine is comprised of monomers, dimers (n=2), trimers (n=3), or oligomers (n>3) of ethanolamine.

11. The shale inhibitor of claim 9, wherein a weight percentage of a product of triethanolamine and epichlorohydrin is in the range of 5-100 wt %.

12. The shale inhibitor of claim 10, wherein a weight percentage of a product from the dimer amines of triethanolamine ranges from 10-60 wt %.

13. The shale inhibitor of claim 10, wherein a weight percentage of a product from trimer amines of triethanolamine and epichlorohydrin ranges from 0-30 wt %.

14. The shale inhibitor of claim 10, wherein a weight percentage of a product from oligomer triethanolamines and epichlorohydrin ranges from 0-30 wt %.

15. The shale inhibitor of claim 9, wherein activity of the shale inhibitor ranges from 10-75%.

16. The shale inhibitor of claim 15, wherein the activity of the shale inhibitor is about 70%.

17. The shale inhibitor of claim 9, wherein the inhibitor comprises residue amines.

18. The shale inhibitor of claim 17, wherein the weight percentage of the residue amines is 0-20% wt.

19. A water-based fluid comprising the shale inhibitor of claim 1, wherein a concentration range of the shale inhibitor is 0.3-5 wt %.

* * * * *